United States Patent [19]
Murguido

[11] Patent Number: 5,737,869
[45] Date of Patent: Apr. 14, 1998

[54] FISHING NET ASSEMBLY

[76] Inventor: Narciso E. Murguido, 2811 S.W. 21st St., Miami, Fla. 33145

[21] Appl. No.: 741,725

[22] Filed: Oct. 31, 1996

[51] Int. Cl.$^6$ ........................................... A01K 69/10
[52] U.S. Cl. ........................ 43/100; 43/102; 43/105
[58] Field of Search ..................... 43/100, 102–105

[56] References Cited

U.S. PATENT DOCUMENTS

| | | | |
|---|---|---|---|
| 1,463,062 | 7/1923 | Roberts | 43/105 |
| 1,747,926 | 2/1930 | Castorina | 43/102 |
| 2,652,656 | 9/1953 | Glasser | 43/105 |
| 2,728,164 | 12/1955 | Mears | 43/105 |
| 3,314,187 | 4/1967 | Marcinkowski | 43/105 |
| 3,645,034 | 2/1972 | Pfahler | 43/105 |
| 4,143,480 | 3/1979 | Bott | 43/105 |
| 4,305,219 | 12/1981 | Ratliffe | 43/105 |
| 4,406,083 | 9/1983 | Hart | 43/105 |
| 4,956,935 | 9/1990 | Riddell | 43/105 |

FOREIGN PATENT DOCUMENTS 1958409  5/1971  Germany ........................ 43/102

Primary Examiner—Joseph J. Hail, III
Assistant Examiner—Darren Ark
Attorney, Agent, or Firm—J. Sanchelima

[57] ABSTRACT

A fishing net assembly that includes two resilient members perpendicularly disposed with respect to each other and having substantially the same dimensions. Two interconnecting cables tense the ends of the resilient members in an arcuate position defining a plane below the point of intersection of the resilient members where a junction assembly is mounted to rigidly keep the resilient members in place. The net is mounted to the cables and defines a sac with one opening through which the crustaceans enter attracted by a bait mounted to underside of the junction assembly. The cables tension the resilient members providing an obstacle to the crustaceans entering the trap. A leader line is attached to the upperside of the junction assembly.

4 Claims, 1 Drawing Sheet

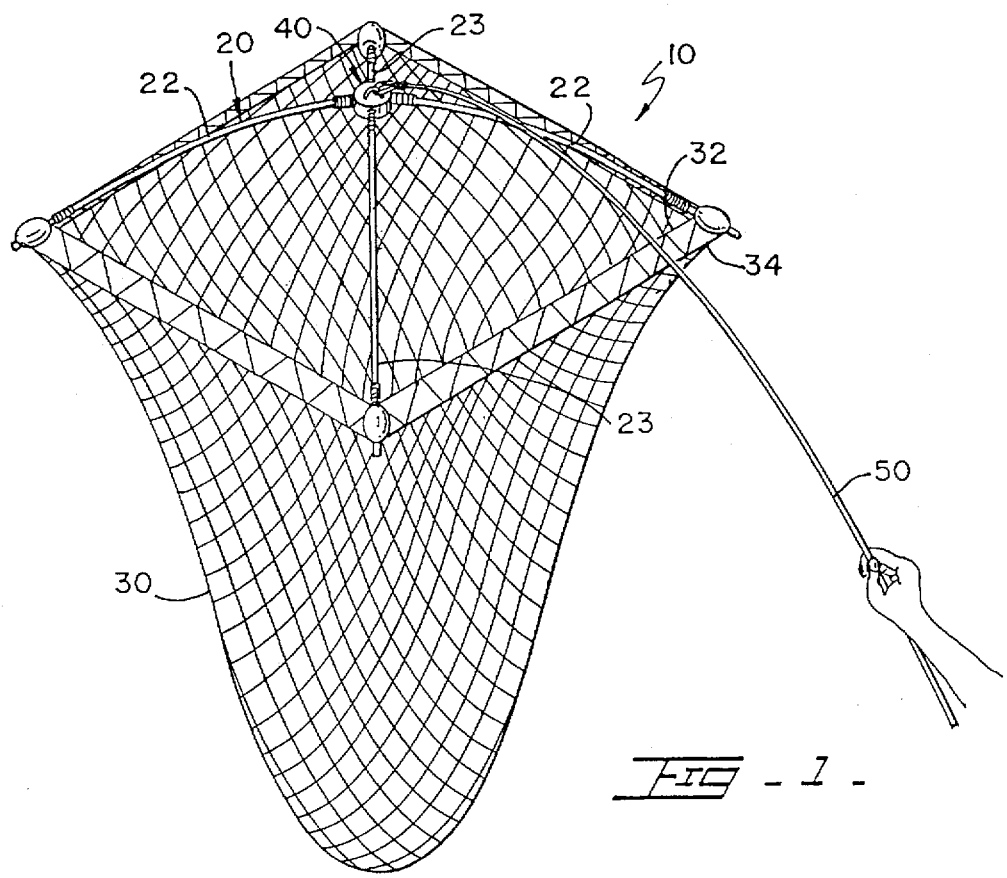
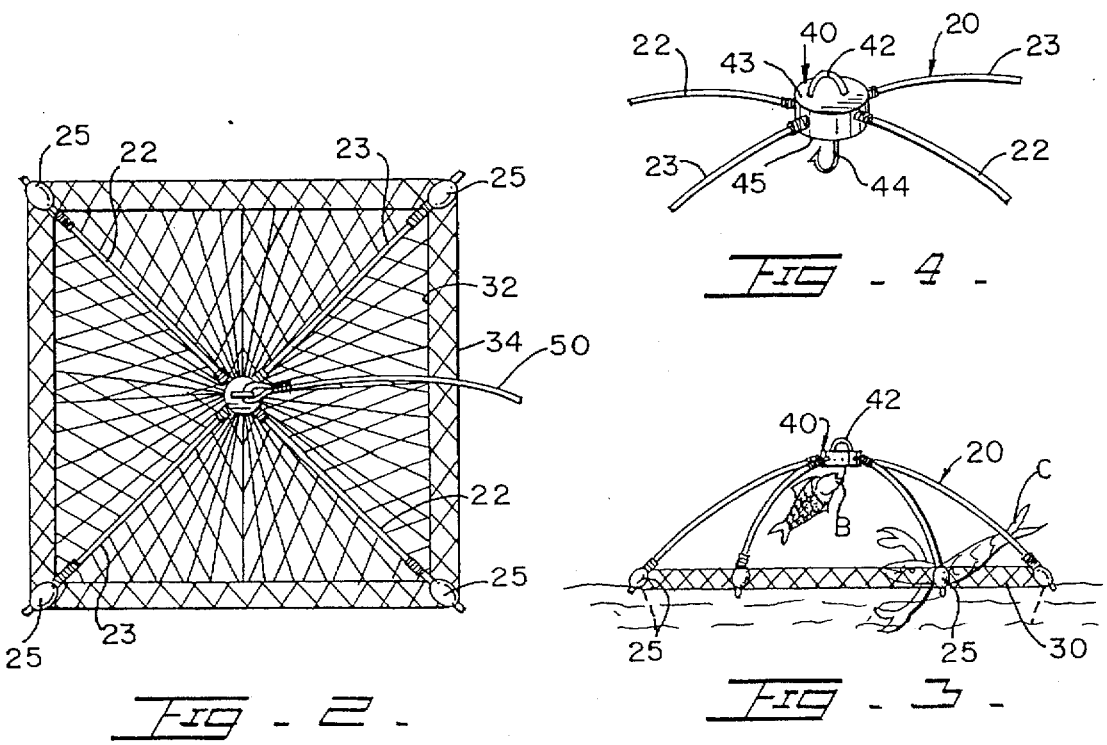

FISHING NET ASSEMBLY

II. BACKGROUND OF THE INVENTION

1. Field of the Invention

The present invention relates to a fishing net assembly, and more particularly, to the type that can be cast away by a user a substantial distance from him or her.

2. Description of the Related Art

Applicant believes that none of the fishing net assemblies that exist today includes the features of the present invention. This invention discloses a comfortable and efficient way to fish crustaceans by fishermen, particularly, near the riverside or seaside.

III. SUMMARY OF THE INVENTION

It is one of the main objects of the present invention to provide a device that can be easily used by fishermen to fish crustaceans primarily.

It is another object of this invention to provide a device that has a such aerodynamic and light structure that permits it to be cast a substantial distance away from the user.

It is still another object of the present invention to provide a fishing net assembly that sinks permitting the entry of crustaceans.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

IV. BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents an isometric view of the present invention from the top.

FIG. 2 shows a top view of this invention.

FIG. 3 shows an elevational view of the sunk fishing net with a crustacean approaching the bait.

FIG. 4 illustrates an isometric view of the junction assembly from the top.

V. DETAILED DESCRIPTION OF THE PREFERRED EMBODIMENT

Referring now to the drawings, where the present invention is generally referred to with numeral 10, it can be observed that it basically includes support assembly 20 that holds net 30, tensioning cables 32 and 34 and leader cable 50 tied to junction assembly 40.

As is shown in FIGS. 1; 2 and 3, support assembly 20 has elongated bars 22 and 23 which are disposed in cross and joined at their center by junction assembly 40. Junction assembly 40 includes loop 42 and hook 44. Bars 22 and 23 are made out of a resilient material, such as fiberglass that provides fishing net assembly 10 the lightness to permit a user to cast it away. Hook member 44 is mounted to lower wall 45 of junction assembly 40 and is designed to hold bait B. Once the crustacean approaches bait B, the user pulls the trap. Typically, crustaceans C are entangled by net 30 and their exit is difficult, thereby giving time to a user to pull the trap.

Four lead members 25 are mounted to the ends of bars 22 and 23, thereby permitting fishing net assembly 10 to sink.

Fishing net 30 is supported, at its upper edge, by tensioning cables 32 and 34, and defining a sac with an upper opening. Cables 32 and 34, in the preferred embodiment, form a square defined by the ends of bar members 22 and 23. Cables 32 and 34 are spaced apart by lead or weight members 25. Cables 32 and 34 keep bars 22 and 23 tensed and in an arcuate position.

A fisherman casts fishing net assembly 10 to a river or sea and pulls the same by leader cable 50. Leader cable 50 is tied to loop 42 of assembly 40 that is mounted to upper wall 43. When the user desires to retrieve fishing net assembly 10, he or she just has to pull it in with leader cable 50, as best seen in FIG. 1.

Cable 32 provides an obstacle to the crustaceans when they try to exit. Cable 32 is a sufficient distance to permit the crustacean in. But, when the crustacean attempts to exit, it will find cable 32 first, above the netting surface at the bottom of the body of water, when the user is fishing.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A fishing net assembly, comprising:

A) two elongated resilient members having each first and second ends and being perpendicularly disposed with respect to each other and said resilient members having substantially the same dimensions;

B) a junction assembly keeping said elongated resilient members rigidly in place and including upper and lower walls, and said junction assembly further includes means for supporting a bait on said lower wall;

C) four weight members mounted adjacent to said first and second ends having a sufficient weight to sink said fishing net assembly;

D) tensioning means for keeping said resilient members in an arcuate position including first and second cable members interconnecting said elongated resilient members on opposite sides of said respective weight members wherein said first and second ends define a plane below said lower wall so that a net mounted to said first and second cables obstruct said crustaceans when they attempt to exit;

E) a net mounted to said tensioning means so that a sac is defined with an opening defined by said tensioning means; and F) a leader line attached to said upper wall.

2. The net assembly set forth in claim 1 wherein said upper wall includes a loop to which said leader line is securely attached.

3. The net assembly set forth in claim 2 wherein said means for supporting a bait is a hook member.

4. The net assembly set forth in claim 3 wherein said resilient members are made out of fiberglass.

* * * * *